United States Patent [19]
Tabata

[11] Patent Number: 5,170,260
[45] Date of Patent: Dec. 8, 1992

[54] SELECTIVE DEGHOSTING OF PLURAL GCR-CONTAINING VIDEO SIGNALS

[75] Inventor: Toshio Tabata, Tokyo, Japan

[73] Assignee: Pioneer Electronic Corporation, Tokyo, Japan

[21] Appl. No.: 713,202

[22] Filed: Jun. 11, 1991

[30] Foreign Application Priority Data

Jun. 15, 1990 [JP] Japan .................. 2-155123

[51] Int. Cl.$^5$ ............................................. H04N 5/21
[52] U.S. Cl. ..................................... 358/167; 358/905
[58] Field of Search ................................ 358/167, 905

[56] References Cited

U.S. PATENT DOCUMENTS 5,055,929 10/1991 Sakai .................................... 358/167

FOREIGN PATENT DOCUMENTS 62-292079 12/1987 Japan .
63-187877 8/1988 Japan .
2-235479 9/1990 Japan .
2-250466 10/1990 Japan .

Primary Examiner—James J. Groody
Assistant Examiner—Mark R. Powell
Attorney, Agent, or Firm—Sughrue, Mion, Zinn, Macpeak & Seas

[57] ABSTRACT

A video-signal-distortion reducing apparatus comprising a filter circuit for selectively passing a broadcast television signal (BC signal) and a laser disc video signal (LD signal). The broadcast television signal has a GCR signal in 18H and 281H of its scanning lines while the laser disc signal has commmand signals for other purposes in 18H and 28H of its scanning lines. A GCR signal is assigned to other scanning lines than 18H and 281H of the laser disc signal. A GCR waveform memory selectively stores the GCR signal superimposed on BC signal in response to a BC signal selecting commmand produced by a timing generator and the GCR signal superimposed on the LD signal in response to an LD signal selecting command. An arithmetic operational circuit detects a delay time and an amplitude difference of the GCR signal stored in the GCR waveform memory relative to a reference GCR signal and controls the filter characteristic such that the delay time and the amplitude difference are minimized.

3 Claims, 3 Drawing Sheets

F I G. 2
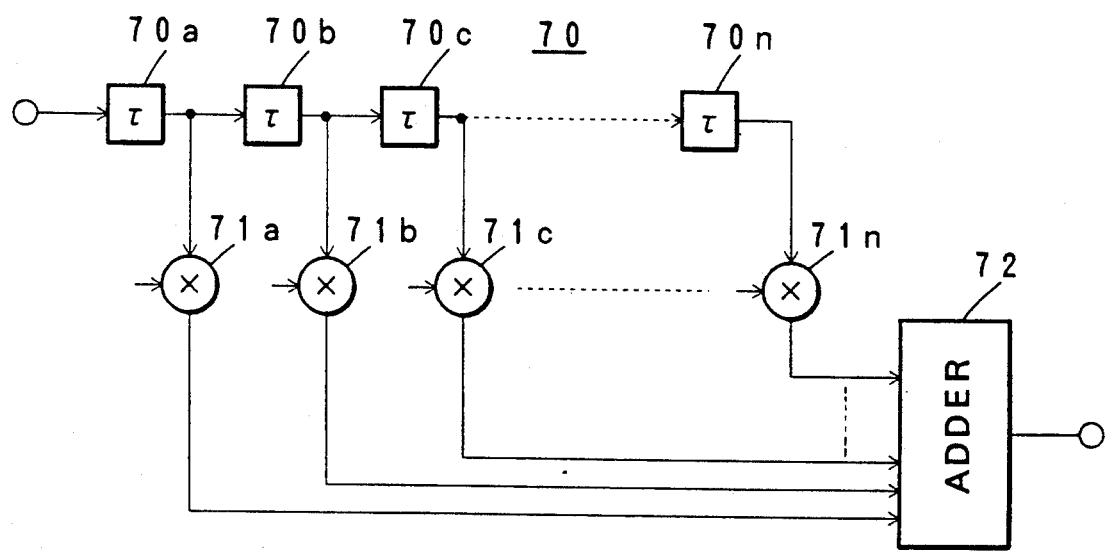

SELECTIVE DEGHOSTING OF PLURAL GCR-CONTAINING VIDEO SIGNALS

BACKGROUND OF THE INVENTION

1. Field of the Invention

The present invention relates to a video-signal-distortion reducing apparatus in which waveform distortion of the video signal is reduced by using a reference signal such as a so-called GCR(Ghost Canceler Reference) signal to recover an original signal.

2. Prior Art

Multipath signals arriving at a receiving antenna contribute to multiple images in the picture called ghosts. Broadcasting stations transmit television signals having a reference signal(Ghost Canceler Reference, or GCR signal) superimposed thereon so that ghost can be eliminated at a receiving side. If the video signal is distroted, so is the GCR signal. Thus, the ghost problem can be eliminated by performing various signal processings on the ghost-interfered video signal on the basis of the degree and time-delay of the GCR signal at the receiving side. The GCR signal is inserted into the 18th(18H) and 281st(281H) horizontal scanning lines of the broadcast signal (referred to as BC signal). The above 18H and 281H lines lie during the vertical retrace interval of the video signal.

If the video signal reproduced from a laser disk is to be displayed on the television set having a ghost canceler circuit incorporated therein, the video signal must detour the ghost canceler circuit since the ghost canceler adversely affects the LD signal. Further, the use of GCR signal might be considered to reduce possible waveform distortion in a video signal reproduced from a laser disc player (referred to as LD signal hereinafter) if the GCR signal can be inserted into the 18th(18H) and 281st(281H) horizontal scanning lines of the LD signal. However, the LD signal has other code signals assigned to the 18th(18H) and 281st(281H) lines.

SUMMARY OF THE INVENTION

An object of the present invention is to provide an apparatus in which a ghost canceler circuit not only reduces the ghost interference of the BC signal but also eliminates the waveform distortion of the LD signal.

A video-signal distortion reducing apparatus according to the invention comprises a filter circuit for selectively passing a broadcast television signal(BC signal) and a laser disc video signal(LD signal). The broadcast television signal has a GCR signal in 18H and 281H of its scanning lines while the laser disc signal has command signals for other purposes in 18H and 281H of its scanning lines. A GCR signal is assigned to other scanning lines than 18H and 281H of the laser disc signal. A GCR waveform memory selectively stores the GCR signal superimposed on BC signal in response to a BC signal selecting command produced by a timing generator and the GCR signal superimposed on the LD signal in response to an LD signal selecting command. An arithmetic operational circuit detects a delay time and an amplitude difference of the GCR signal stored in the GCR waveform memory relative to a reference GCR signal and controls the filter characteristics such that the delay time and the amplitude difference are minimized.

BRIEF DESCRIPTION OF THE DRAWINGS

Features and other objects of the invention will be more apparent from the detailed description of the preferred embodiments with reference to the accompanying drawings in which:

FIG. 2 shows the construction of a waveform equalizing filter in FIG. 1; and

DETAILED DESCRIPTION OF THE PREFERRED EMBODIMENTS

Embodiment

Figure 1:
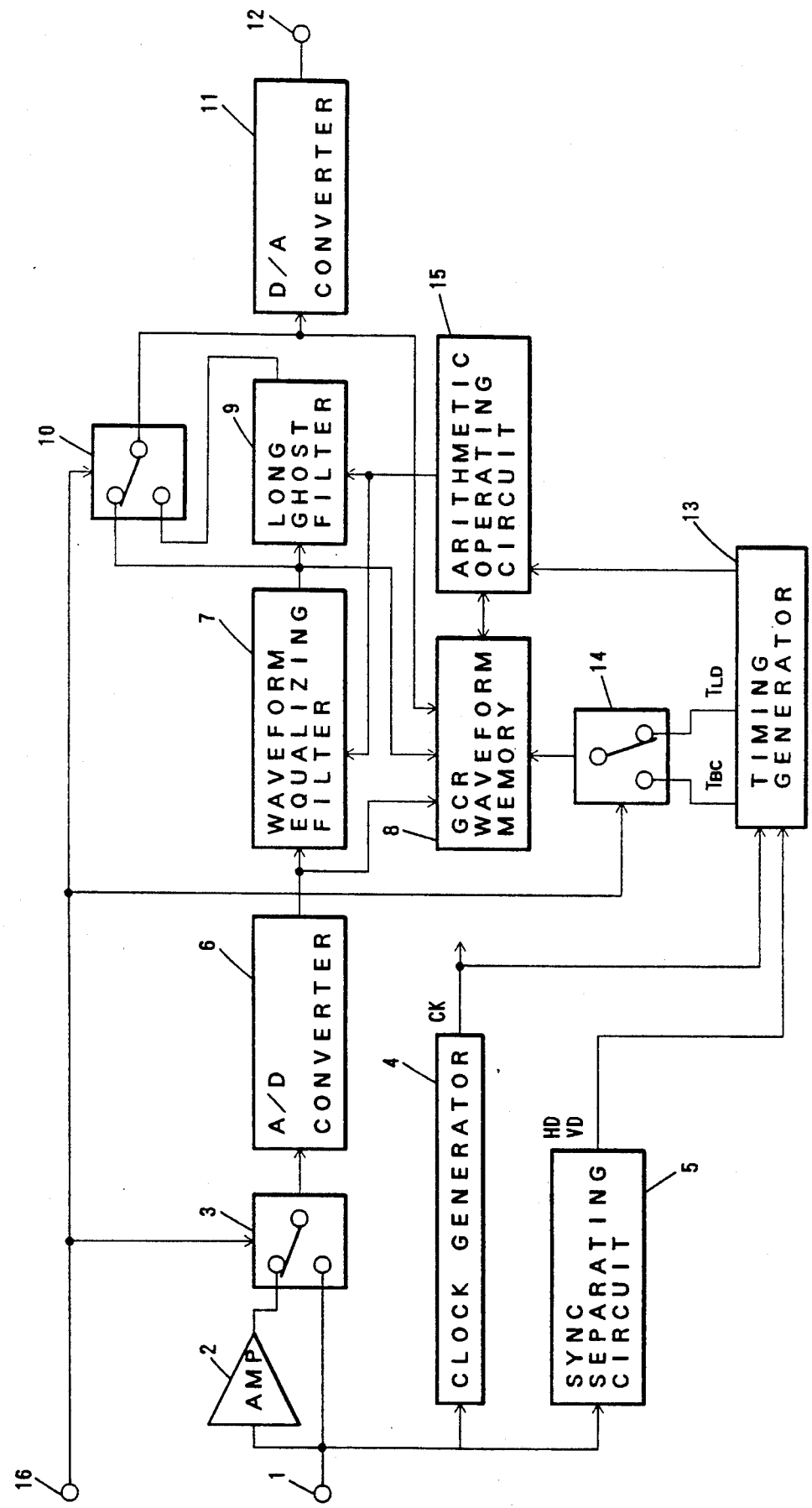
FIG. 1 is a block diagram showing an embodiment of a video-signal distortion reducing apparatus according to the present invention.

FIG. 1 is a diagram showing an embodiment of a video-signal distorting reducing apparatus according to the present invention. A BC signal or an LD signal is supplied to an amplifier 2, a switch 3, clock generator 4, and synchronous separation circuit 5 via an input terminal 1. The switch 3 selectively receives the input and output of amplifier 2 in response to a BC/LD selecting command from a control terminal 16 and sends the video signal to an A/D converter 6 whose output is supplied to both a waveform equalizing filter 7 and a GCR waveform memory 8. The output of waveform equalizing filter 7 is supplied to a second input of the GCR waveform memory 8, a long-ghost filter 9 that eliminates ordinary ghost images. A switch 10 selectively receives the input and output of the long-ghost filter 9 to feed it to a D/A converter 11 and to a third input of the GCR waveform memory 8.

The clock generator 4 produces a clock signal CK which is supplied to the A/D converter 6, waveform equalizing filter 7, long-ghost filter 9, and timing generator 13. The synchronous separation circuit 5 produces a horizontal sync signal HD and a vertical sync signal VD on the basis of the video signal supplied via the terminal 1. The signals VD and HD are supplied to the timing generator 13, which in turn produces various timing signals based on the clock signal CK and horizontal and vertical sync signals HD and VD. The timing generator 13 also produces a TBC signal used for sampling the GCR signal from the BC signal and a TLD signal used for sampling the GCR signal from the LD signal. The TBC signal and TLD signal are selectively supplied to the GCR waveform memory 8 by the switch 14 in response to the BC/LD selecting signal supplied to the terminal 16. The arithmetic operational circuit 15 calculates multiplying coefficients for controlling the filter characteristic on the basis of the delay time and amplitude of the GCR signal read out of the GCR waveform memory 8 and sends them to the filters 7 and 9.

The three switches 3, 10, 14 are operated simultaneously by the BC/LD selecting signal supplied through the control terminal 16. FIG. 1 shows the switch positions when the LD signal is processed.

FIG. 2 show the construction of the waveform equalizing filter 7. A delay line 70 takes the form of a plurality of cascaded delay elements 70a–70n so constructed that the signal are taken out via the respective taps with a multiple of a predetermined delay time T. Each of a plurality of multipliers 71a–71n multiplies a delayed signal from the respective tap by a desired coefficient supplied from the arithmetic operational circuit 15 so as to give a desired tap gain. An adder 72 adds the outputs of the multipliers 71a–71n to output the original video signal whose distortion component is canceled out when the multipliers 71a–71n are set their coefficients properly.

Figure 3:
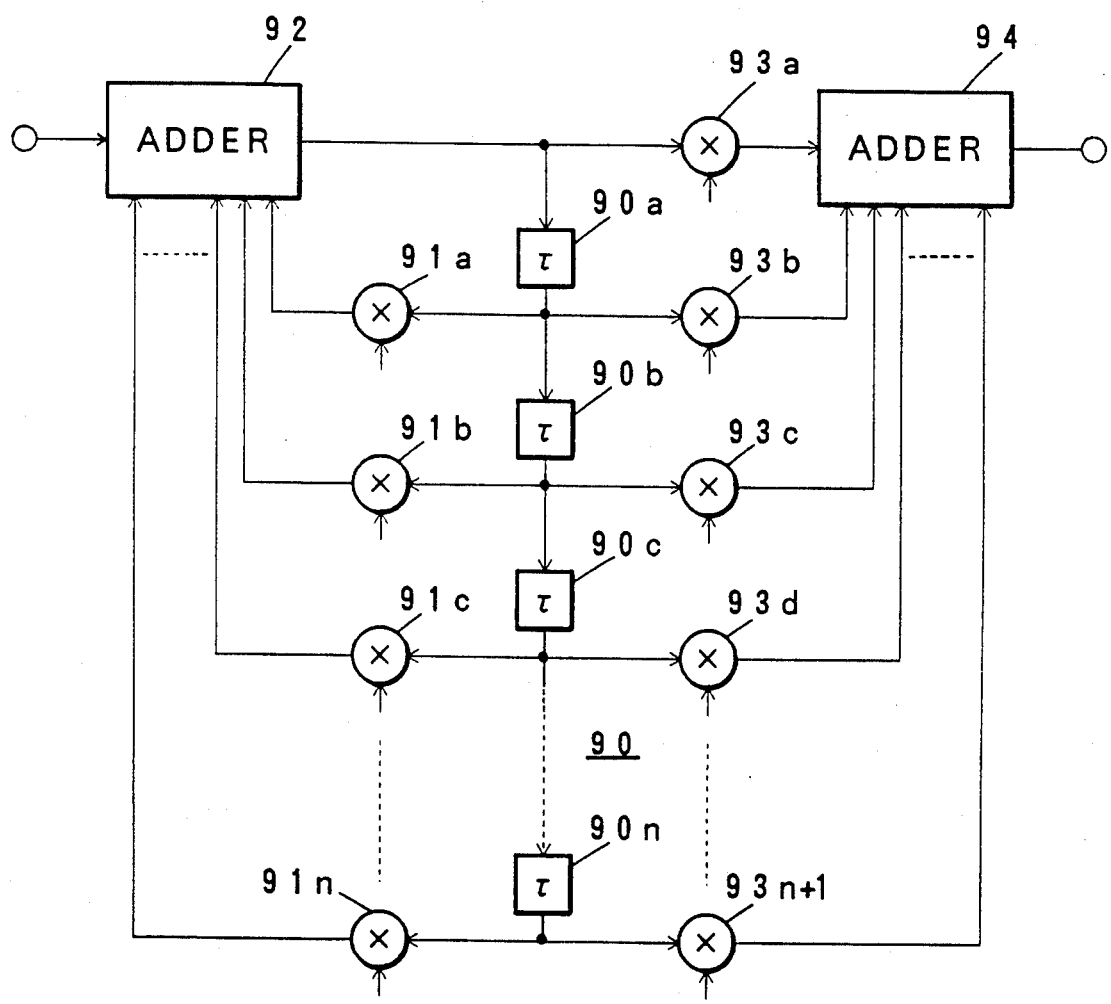
FIG. 3 shows the construction of a long-ghost filter.

FIG. 3 shows the construction of the long-ghost filter 9. A delay line 90 is made up of a plurality of delay elements 90a–90n. Each of a plurality of multipliers 91a–91n multiplies a delayed output signal of the respective cascaded delay element by a desired coefficient so as to set a desired tap gain of the delay line 90. An adder 92 adds the outputs of these multipliers 91a–91n to obtain a total value. A multiplier 93a sends the output of adder 92 multiplied by a desired tap gain to the adder 94. Likewise, each of a plurality of multipliers 93b to 93n+1 sends the delayed output of the respective delay element 90a–90n multiplied by desired coefficient. The adder 94 receives the outputs of the multipliers 93a to 93n+1 and adds them up. The arithmetic operational circuit 15 supplies the multipliers 71a–71n, 91a–91n and 93a to 93n+1 with the respective coefficients.

The video-signal-distortion reducing apparatus can also be incorporated in an laser disc player so that possible ghost interference may be eliminated.

The GCR signal may be inserted into the LD signal when recording, so that the video signal can be properly reproduced by the use of the GCR signal. This eliminates the necessity of providing a GCR-signal-inserting circuit in the laser disc player.

Operation

When the BC signal is inputted to the input terminal 1, the respective switches 3, 10, 14 are switched to the positions opposite to those shown in FIG. 1 in response to the BC/LD selecting signal supplied to the terminal 16. The BC signal is supplied via the switch 3 directly to the A/D converter 6 which converts the signal into a digital form and sends it to the waveform equalizing filter 7. The digital video signal through the waveform equalizing filter 7 is fed to the GCR waveform memory 8 which in turn reads in, with the aid of the timing signal TBC from the timing generator 13, the signals in the scanning line 18H and 218H on which the GCR signal is superimposed. The arithmetic operational circuit 15 receives the GCR signal thus read in so as to calculate the difference between an internally generated GCR signal and the GCR signal from the GCR waveform memory 8. In this manner, only the ghost component of the GCR signal existing in the horizontal scanning lines (18H and 218H) is sampled. The arithmetic operational circuit 15 sets the multiplying coefficients for the multipliers 71a–71n such that the sampled ghost component is canceled out. The above mentioned procedure is repeated so that the filter characteristics is modified in such a direction as to ultimately eliminate the "difference between the ghost component and the internally generated GCR signal."

The video signal that has been removed proximity ghost by the filter 7, is supplied to the long-ghost filter 9 which processes the signal in a way similar to the filter 7 so as to eliminate the long-ghost. The video signal that has been removed long-ghost is then converted by the D/A converter 11 into an analog signal.

When the LD signal is inputted to the input terminal 1, the respective switches 3, 10, 14 are switched to the positions shown in FIG. 1 in response to the BC/LD selecting signal supplied to the terminal 16. The GCR signal is assumed to have been inserted into the LD signal by a GCR-signal-inserting circuit. The LD signal is amplified by the amplifier 2 and is then supplied to the A/D converter 6 via the switch 3. The BC signal may exceed the white peak level or become below the SYNC tip due to ghost, and therefore the BC signal of a relatively low level is supplied to the A/D converter 6 for a sufficient dynamic range rather than through the amplifier 2. In contrast to this, the LD signal is stable in signal level and therefore the LD signal is amplified its level to utilize the full dynamic range of A/D converter 6 for good signal-to-noise ratio. If the input level is high enough, an attenuator may be used in place of the amplifier 2.

The digital video signal from the A/D converter 6 is inputted to the waveform equalizing filter 7 whose output is supplied to the GCR waveform memory 8, which in turn reads in, with the aid of the timing signal TLD from the timing generator 13, the signals in the horizontal scanning lines, for example, 15H and 278H on which the GCR signal for the LD signal is superimposed. The arithmetic operational circuit 15 receives the GCR signal thus read in so as to calculate the difference between the internally generated GCR signal and the GCR signal from the GCR waveform memory 8 for the detection of waveform distortion. The arithmetic operational circuit 15 sets the multiplying coefficients for the multipliers 71a–71n such that the detected waveform distortion is equalized. The above-mentioned procedure is repeated so that the filter characteristic of waveform equalizing filter 7 is modified in such a direction as to reduce the distortion of frequency response of the GCR signal. Thus, the aforementioned operation is repeated to ultimately equalize the LD video signal up to 4.2 MHz of the band width of GCR signal.

The waveform-equalized video signal is inputted via the switch 10 to the D/A converter 11 which converts the digital video signal into an analog signal and outputs it to an external circuit through the output terminal 12.

What is claimed:

1. A video-signal-distortion reducing apparatus comprising:
    a filter circuit for selectively passing a first video signal and a second video signal therethrough, said first video signal having a first GCR signal in a first location of horizontal scanning lines thereof and said second video signal having a second GCR signal in a second location of horizontal scanning lines thereof, said filter having filter characteristics variable in accordance with a control signal supplied thereto;
    a timing generator for generating a first-video-signal selecting command on the basis of said first video signal and for generating a second-video-signal selecting command on the basis of said second video signal;
    a GCR waveform memory for storing said first GCR signal superimposed on said first video signal in accordance with said first-video-signal selecting command and for storing said second GCR signal superimposed on said second video signal in accordance with said second-video-signal selecting command;
    an arithmetic operational circuit for detecting a delay time and an amplitude difference of a one of said first GCR signal and said second GCR signal stored in said GCR waveform memory relative to a reference GCR signal to produce said control signal so as to vary said filter characteristic such that said delay time and said amplitude are minimized.

2. A video-signal-distortion reducing apparatus according to claim 1, wherein said first video signal is a television broadcast signal and said second signal is a laser disc signal.

3. A video-signal-distortion reducing apparatus according to claim 1, wherein said first-video-signal selecting command is produced on the basis of a clock signal and a sync signal of said first video signal and said second-video-signal selecting command is produced on the basis of a clock signal and a sync signal of said second video signal.

* * * * *